Nov. 1, 1932.   A. D. MILLER   1,886,039
INSECT DESTROYER
Filed Aug. 10, 1929
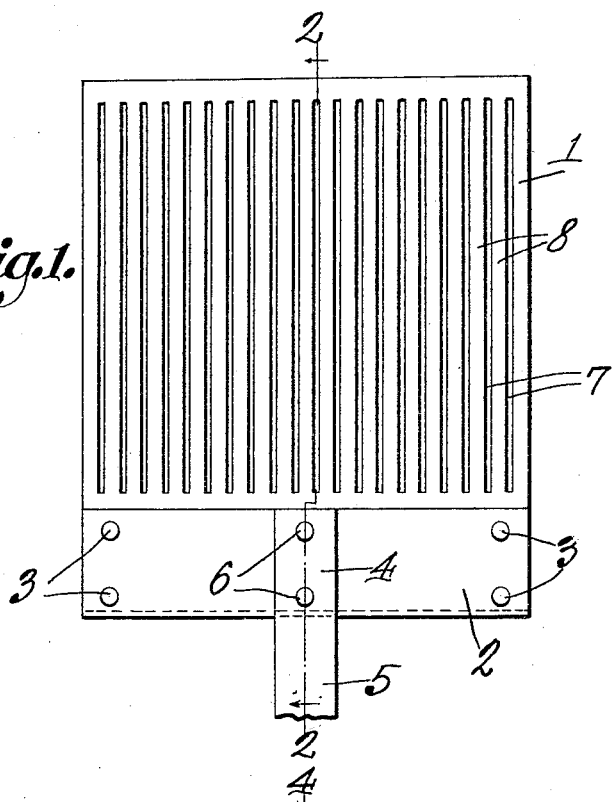
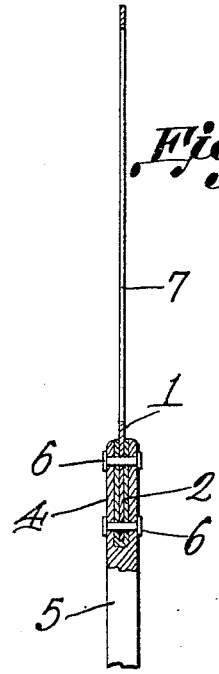
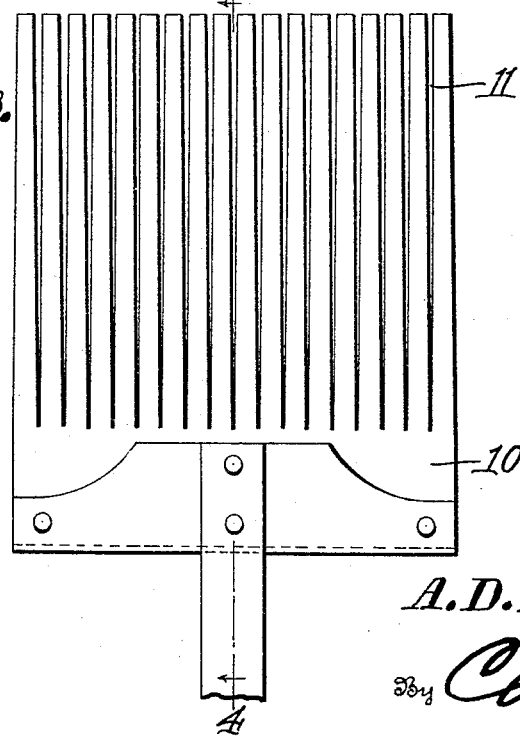
A.D. Miller
Inventor
By C. A. Snow & Co.
Attorneys.

Patented Nov. 1, 1932

1,886,039

UNITED STATES PATENT OFFICE

ALBERT D. MILLER, OF GOSHEN, INDIANA

INSECT DESTROYER

Application filed August 10, 1929. Serial No. 384,887.

This invention relates to insect destroyers, one of the objects being to provide a device of this type which can be made out of sheet rubber, rubberized fabric, imitation rubber, etc., which will be highly efficient in use, and, by reason of its construction, will not injure articles against which it may be brought into violent contact.

Another object is to provide a device which can be made cheaply and sold at a cost no greater than that of others ordinarily made of wire fabric.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred forms of the invention have been shown.

In said drawing,

Figure 1 is a plan view of a swatter embodying the present improvements.

Figure 2 is a section on line 2—2, Figure 1.

Figure 3 is a view similar to Figure 1 showing a modified construction.

Figure 4 is a section on line 4—4, Figure 3.

Referring to the figures by characters of reference, 1 designates a thin sheet of rubber, rubberized fabric, or the like, one end portion of which is reinforced by placing it within a folded strip 2 of similar material or of metal, these parts being held together by small rivets 3 or the like. The forked end 4 of a handle 5 may be placed astride the middle portion of the strip 2 and held thereto by rivets or other suitable fastening means as shown at 6.

In the structure illustrated in Figure 1 that portion of the sheet 1 projecting beyond the strip 2 is formed with parallel slots 7 closed at both ends and providing narrow spaced strips 8. The width of the slot 7 is not great enough to permit the passage of an insect therethrough and, consequently, the device can be used efficiently for the purpose intended, there being a free flow of air through the slots so as to eliminate any tendency of the device to blow the insect away from the path of the sheet 1. By connecting the strips 8 at their outer ends or, in other words, at those ends remote from the handle, there is no danger of the same becoming frayed or entangled.

If desired the strips 10 can be separated at their free ends as shown in Figures 3 and 4. In the structure illustrated in these figures the slots are not parallel but are tapered as shown at 11. Thus the action of the device will be substantially the same as the one illustrated in Figure 1.

As the strips formed between the slots 11 and between the slots 7 are of freely flexible material and relatively soft, there is no danger of injury being caused to articles against which the device may be brought violently.

What is claimed is:

A device of the kind described including a body consisting of a sheet of soft and highly flexible but relatively heavy rubber like material of substantially rectangular form provided with a series of spaced and tapered slots extending from the front edge of the body to a line parallel to the rear edge of said body whereby to provide tapering strips extending forwardly from the unslotted portion, said strips normally being in the same plane and having their longitudinal middle lines parallel, and said slots being unobstructed and of sufficient width to allow free passage of air therethrough.

In testimony that I claim the foregoing as my own, I have hereto affixed my signature.

ALBERT D. MILLER.